(12) United States Patent
Lesser et al.

(10) Patent No.: US 11,217,002 B2
(45) Date of Patent: Jan. 4, 2022

(54) METHOD FOR EFFICIENTLY COMPUTING AND SPECIFYING LEVEL SETS FOR USE IN COMPUTER SIMULATIONS, COMPUTER GRAPHICS AND OTHER PURPOSES

(71) Applicant: Weta Digital Limited, Wellington (NZ)

(72) Inventors: Stephen K. Lesser, Wellington (NZ); Tomáš Skřivan, Wellington (NZ)

(73) Assignee: WETA DIGITAL LIMITED, Dallas, TX (US)

( * ) Notice: Subject to any disclaimer, the term of this patent is extended or adjusted under 35 U.S.C. 154(b) by 0 days.

(21) Appl. No.: 17/184,236

(22) Filed: Feb. 24, 2021

(65) Prior Publication Data

US 2021/0272345 A1  Sep. 2, 2021

Related U.S. Application Data

(60) Provisional application No. 62/983,423, filed on Feb. 28, 2020.

(51) Int. Cl.
| | | |
|---|---|---|
| *G06T 13/60* | (2011.01) |
| *G06T 17/20* | (2006.01) |
| *G06T 17/05* | (2011.01) |
| *G06T 15/06* | (2011.01) |

(52) U.S. Cl.
CPC ............. *G06T 13/60* (2013.01); *G06T 15/06* (2013.01); *G06T 17/05* (2013.01); *G06T 17/20* (2013.01); *G06T 2210/24* (2013.01)

(58) Field of Classification Search
CPC .................................................... G06T 13/60
See application file for complete search history.

(56) References Cited

U.S. PATENT DOCUMENTS

| | | | | |
|---|---|---|---|---|
| 9,811,941 B1* | 11/2017 | Hankins | ................. | G06T 13/60 |
| 2003/0090484 A1* | 5/2003 | Comair | ................. | G06T 13/60 |
| | | | | 345/420 |

(Continued)

OTHER PUBLICATIONS

Darles, Emmanuelle, et al. "A survey of ocean simulation and rendering techniques in computer graphics." Computer Graphics Forum. vol. 30. No. 1. Oxford, UK: Blackwell Publishing Ltd, 2011. (Year: 2011).*

*Primary Examiner* — Ryan McCulley
(74) *Attorney, Agent, or Firm* — Haynes and Boone, LLP; Philip H. Albert

(57) ABSTRACT

Surface features might represent features of a virtual fluid and a method might include obtaining a digital representation of the virtual fluid defined at least in part by an implicit surface, obtaining a digital representation of a collection of points defined relative to the implicit surface whereat the surface features are to be determined. A point of the collection of points might have associated therewith a plurality of attribute values specifying a property of the surface features. For an input point, a corresponding implicit surface point might be determined, along with, for the corresponding implicit surface point, a subset of the points within a search region. Interpolated attribute values might be obtained from attribute values associated with points of the subset, and a surface displacement value computed from interpolated attribute values. A dataset corresponding to the surface features might be generated.

20 Claims, 14 Drawing Sheets

(56) References Cited

U.S. PATENT DOCUMENTS

2004/0181382 A1* 9/2004 Hu .................... G06T 15/04
  703/9
2015/0006126 A1* 1/2015 Taguchi ............ G06K 9/6211
  703/2
2019/0362035 A1* 11/2019 Jeschke .............. G06T 13/60

* cited by examiner

Pseudocode for Function "sampleVolumeResult"

```
// Return implicit surface distance at position P
float sampleVolumeResult( vec3f P)
{
        // Make sure we are close enough to surface to apply deformation
        float distanceToSurface = sample volumeInput distance at P;
        if (abs(distanceToSurface) > maximumDisplacement)
                return distanceToSurface;

// Get the closest surface location
        vec3f gradient = normalised( sample volumeInput distanceGradient at P );
        vec3f surfacePosition = P – gradient * distanceToSurface;

// Create line segment from above to below surface
        // through the surfacePosition to search for triangles
        vec3f rayStart = surfacePosition - gradient * searchBandwidth / 2;
        vec3f rayEnd = surfacePosition + gradient * searchBandwidth / 2;

// Use ray tracing along line segment to collect all intersecting triangles
        // within search region and interpolated vertex values based on
        //  intersection location
        vector<triangleIntersection> intersectingTriangles = rayIntersect(rayStart,
rayEnd, triangles);

// For each intersection determine deformation in normal direction and
        // accumulate to final distance value
        float totalDisplacement = 0;
        foreach triangleIntersection in intersectingTriangles {
                // Use barycentric coordinates to interpolate vertex
                // values of triangle to ray intersection point
                float displacement = verticalDisplacement( triangleIntersection );
                totalDisplacement += displacement;
        }

// Apply smooth clamp to total displacement to avoid runaway displacement
        totalDisplacement = easedClamp( totalDisplacement,
maximumDisplacement );
        return distanceToSurface + totalDisplacement;

Pseudocode for Function ""verticalDisplacement"

```
// Example vertical displacement function for a cosine
float verticalDisplacement( triangleIntersection )
{
        return cosine( triangleIntersection.phase ) * triangleIntersection.amplitude;
}
```

FIG. 12

METHOD FOR EFFICIENTLY COMPUTING AND SPECIFYING LEVEL SETS FOR USE IN COMPUTER SIMULATIONS, COMPUTER GRAPHICS AND OTHER PURPOSES

CROSS-REFERENCES TO PRIORITY AND RELATED APPLICATIONS

This application claims the benefit of, and priority from, U.S. Provisional Patent Application No. 62/983,423 filed Feb. 28, 2020, entitled "Method for Simulating Fluid Surfaces."

The entire disclosure of the application recited above is hereby incorporated by reference, as if set forth in full in this document, for all purposes.

FIELD

The present disclosure generally relates to modeling surface features of fluids and more particularly to efficient computation and specification of level sets and other fluid surface features.

BACKGROUND

Visual representations of scenes intended to reflect real-world scenarios are common in animation and other fields. For example, a computer-generated imagery scene could be created by having an artist manually draw a sequence of frames to form a video sequence. For simple cartoons, for example, this is a feasible approach. However, as viewers have come to expect more complex visuals, there is a need for computer-driven imagery generation.

The complex visuals might be derived from an output of a simulation and/or or use manually specified details. Manually specifying a large number of details can be tedious. In some scenes, it might be desirable to include some simulation output with manually specified details and it might be desirable to have some high-resolution details and some lower-resolution details in the same scene. As a result, a renderer or other portion of an image generation system might require tedious specification of smoothed details from an artist or other user.

A scene might be specified in terms of objects present in a three-dimensional (3D) virtual space, a camera location and orientation in that 3D virtual space, and a camera view frame positioned in that virtual space. Some objects might include light sources. Details of the objects might be specified using outputs of a simulation. For example, a scene might comprise an image of a ship on a body of water and where an image is to be generated of the scene from a camera position, a computer image generation system might determine an appearance of the ship and the water based on a simulation of where the ship might be in the 3D virtual space and where the surface of the water might be.

In one approach, the surface of the water is represented by a large collection of connected polygons that form a fine mesh. The positions of vertices and edges of the polygons might be determined from an output of a simulator or might be determined by artist input. Where a fine mesh is present, it might be computationally expensive to deal with all of the vertices when determining a water surface and if input by an artist, might be tedious. Where a coarse mesh is used, while that might be computationally easier to deal with and maybe easier for an artist to input, the result might be undesirably crude. Another disadvantage of a mesh is that information can be lost as a surface is discretized into a mesh.

Improved methods and apparatus that might reduce an amount of computing power needed and/or provide an improved user interface for user specification of details might be desired.

SUMMARY

A computer-implemented method and apparatus for sampling surface features, wherein the surface features represent features of a virtual fluid, might comprise, under the control of one or more computer systems configured with executable instructions, obtaining a first digital representation of the virtual fluid defined at least in part by an implicit surface, obtaining a second digital representation of a collection of points defined relative to at least a portion of the implicit surface whereat the surface features are to be determined, wherein a point of the collection of points has associated therewith a plurality of attribute values specifying a property of the surface features, determining, for an input point, a corresponding implicit surface point, determining, for the corresponding implicit surface point, a subset of the collection of points within a search region relative to the corresponding implicit surface point, obtaining a set of interpolated attribute values by interpolating attributes of the plurality of attribute values associated with points of the subset of the collection of points, computing a surface displacement value from the set of interpolated attribute values, generating a dataset corresponding to the surface features on at least computed surface displacement values.

The property of the surface features might be a displacement from the implicit surface. Determining the corresponding implicit surface point for the input point might comprise determining a first signed distance field value for the input point, determining a first field gradient value for the input point, and determining the corresponding implicit surface point from a position of the input point, the first signed distance field value, and the first field gradient value.

The collection of points might be a collection of vertices that represents a mesh region might comprise a plurality of vertices defining a plurality of polygons. The first digital representation might represent the virtual fluid in an Eulerian grid representation and the second digital representation represents the mesh region as a plurality of Lagrangian points.

One or more visual representations of the surface features might depict capillary waves on a surface of the virtual fluid.

The collection of points might be defined at a higher resolution than the implicit surface. The plurality of attribute values might comprise a phase value and/or an amplitude value. The collection of points might represent a mesh, and determining the subset of the collection of points within the search region relative to the corresponding implicit surface point might comprise (a) using ray casting to cast a ray from the input point through the corresponding implicit surface point, (b) identifying one or more intersected polygons of a plurality of polygons of the mesh that are intersected by the ray, (c) determining a plurality of vertices corresponding to vertices of one or more polygon of the one or more intersected polygons, and (d) processing the plurality of vertices as the subset of the collection of points.

The ray might extend from the input point passing through the corresponding implicit surface point to a ray endpoint that might be a predetermined distance from the corresponding implicit surface point along the ray. The ray might extend to a sample position for which a signed distance between the sample position and the implicit surface meets a maximum-displacement threshold.

Methods and apparatus might further comprise obtaining a second plurality of distances for a second plurality of sample positions, wherein the second plurality of sample positions includes a particular sample position for which the signed distance between the particular sample position and the implicit surface does not meet the maximum-displacement threshold, each distance of the second plurality of distances being equal to the signed distance between the particular sample position and the implicit surface, and wherein the generating one or more visual representations might be based on at least some of the second plurality of distances.

A computer system for generating one or more visual representations of surface features of a virtual fluid might comprise at least one processor, and a computer-readable medium having stored instructions that when executed by the at least one processor cause the computer system to carry out one or more of the methods described herein.

A non-transitory computer-readable storage medium storing instructions might be provided, which when executed by at least one processor of a computer system, might cause the computer system to carry out one or more of the methods described herein.

A computer-readable medium might be provided carrying instructions, which when executed by at least one processor of a computer system, causes the computer system to carry out one or more of the methods described herein.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 10 shows pseudocode implementing a sample volume result function calculation.

FIG. 12 shows pseudocode implementing a vertical displacement function calculation.

DETAILED DESCRIPTION

Figure 1:
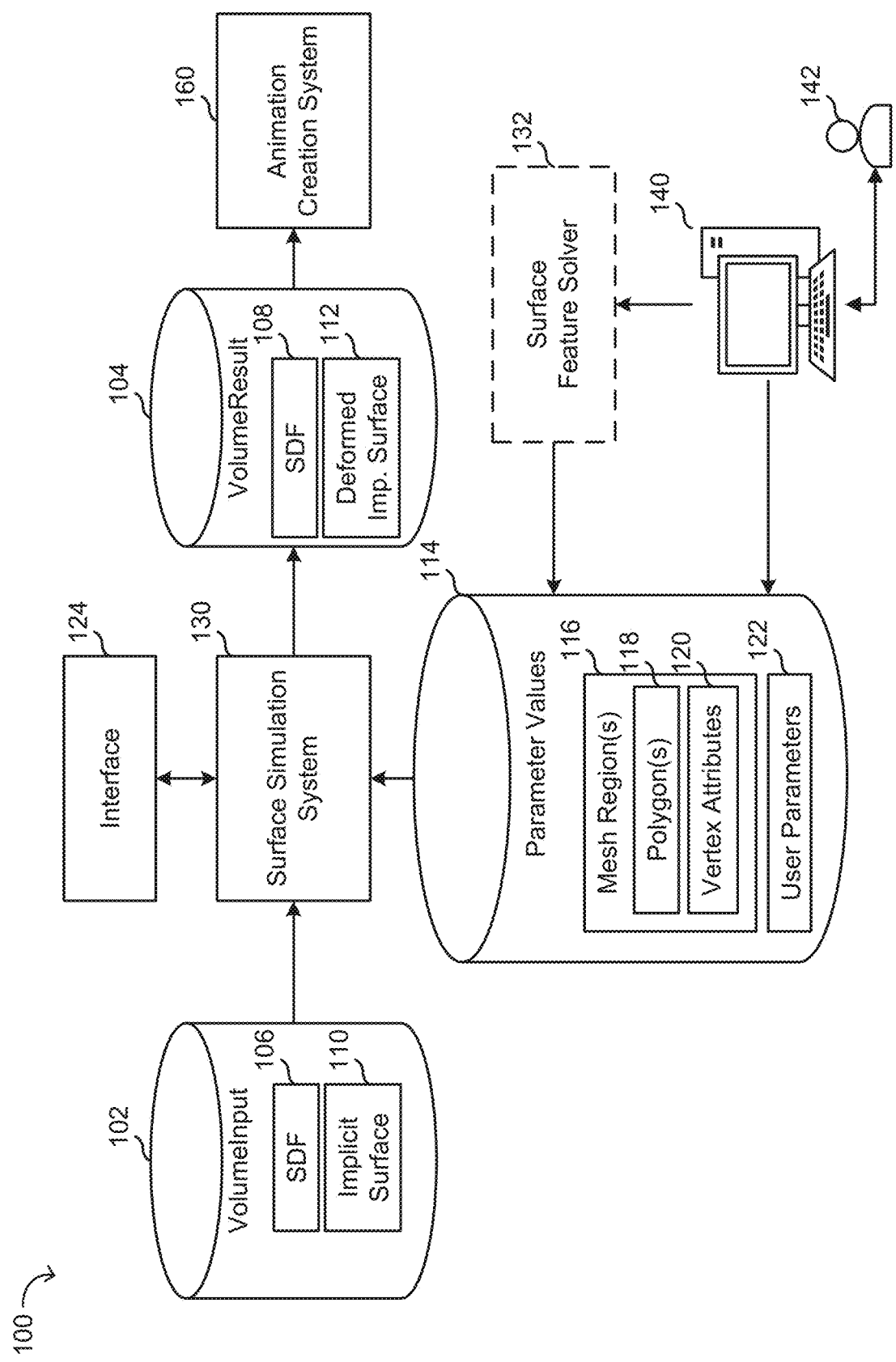
FIG. 1 is a diagram of a data flow through a system for generating a resultant implicit surface volume that is used to create visual representations of a volume of fluid and/or its surface.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many of the examples described herein, inputs to a computer simulation system include parameters about the virtual material/object/fluid/etc. being simulated and an output of a computer simulation are the positions/mass/movement/etc. of the virtual material/object/fluid/etc. Such an output might be an input to an animation system, which can provide for rendering computer-generated imagery of the virtual material/object/fluid/etc. present in a scene in a virtual space. The computer-generated imagery might be still images, stereoscopic images, video sequences, and/or stereoscopic video sequences. In some cases, the computer simulation of virtual elements seeks to match what would happen with corresponding real-world elements, but in other cases, artistic or other inputs are used in the computer simulation to create effects that do not correspond to anything in the real-world, or at least anything in available physical environments. For example, in a given simulation, an operator of a simulation engine might provide an input that corresponds to gravity "turning off" for a short period of time, which can be simulated but has no real-world correspondence.

Computer simulation that is used for imagery generation has been used to animate natural phenomena as well as natural movements of characters, such as by using a physics engine to output movements of an articulated character that are consistent with real-world physics and joint constraints. In some ways, this is often a simple problem—how to determine natural-looking movements of at most a few dozen attached body parts. For other simulations, such as those with flexible objects, fluids, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources. Simulation computations involving fluid surface features and other fluid interactions can often involve such trade-offs.

For example, a higher spatial resolution is required to smoothly capture ultra-high-resolution surface features (such as capillary waves, swells, etc.) than is typically used to model a bulk fluid. When a visual effects ("VFX") shot requires the surface to be large, the computing resources required to generate the surface at the higher resolution can exceed those available. Breaking the problem into a bulk fluid simulation for most of the fluid motion and a secondary geometric-based simulation for the fine geometric surface detail (like capillary waves) may help break the problem into two solvable simulation components, but there still remains the problem of how to combine these two simulation components into a new volume having both a large volume extent and the fine geometric surface detail.

One previous approach for generating such a combined volume involved generating a new implicit surface volume having a resolution determined by the finest detail of the bulk fluid and the geometric surface details. The new implicit surface volume was limited to a narrow band, which hopefully fit into available memory. Another previous approach involved using an analytic representation of the geometric surface details (or high frequency component), such as simplex noise. The analytic representation can be evaluated in (or represented by) a shader after the original implicit surface is sampled. Then, the implicit surface is deformed as part of a shading operation (using the shader) that includes oversampling the original implicit surface volume to capture the fine geometric surface detail.

The term "implicit surface" is used herein to describe a surface expressed generally by Equation 1 in three-dimensional ("3D") space.

$$F(x,y,x)=0 \qquad \text{(Eqn. 1)}$$

By way of a non-limiting example, an example plane may be expressed as an implicit surface by Equation 2.

$$x+2y-3z+1=0 \qquad \text{(Eqn. 2)}$$

The term "implicit surface volume" is used herein to describe a volume bounded at least in part by an implicit surface. In other words, an inside of the implicit surface faces the implicit surface volume and an outside of the implicit surface faces away from the implicit surface volume.

The term "signed distance" refers to a shortest distance between a point in space and a surface (e.g., an implicit surface). A positive signed distance is on a first side (e.g., the outside) of the surface and a negative signed distance is on a second side (e.g., the inside) of the surface.

The term "signed distance field" refers to a data structure for sampling the signed distance value for any position in 3D space. Within a signed distance field, the surface (e.g., an implicit surface) is positioned where the signed distances are zero.

In a more general case, computations involving virtual scenes might use a "level set" that represents a set of points that have a constant signed distance. Thus, a given level set might represent the set of points that are ten units above a surface that is expressed by some function. In many instances and examples herein, where an operation involves an implicit surface, they might be generalized to apply to level sets, possibly treating the implicit surface simply as the level set having a constant signed distance of zero.

FIG. 1 is a diagram of a data flow through a system 100 when the system 100 is performing a process (such as a process 700 illustrated in FIG. 7 below) that deforms an implicit surface 110 of an input implicit surface volume ("volumeInput") 102 to generate a deformed implicit surface 112 of a resultant implicit surface volume ("volumeResult") 104. The volumeInput 102 may be defined by, include, or be associated with a signed distance field 106 and the volumeResult 104 may be defined by, include, or be associated with a signed distance field 108. Both the volumeInput 102 and the volumeResult 104 may be used to model the same volume of a fluid. But, the volumeResult 104 has finer surface detail than the volumeInput 102. Further, the volumeResult 104 may represent the volume of the fluid undergoing changes (e.g., being blown by wind, stirred, and the like). The volumeResult 104 is supplied to an animation creation system 160 component of an example visual content generation system 1300 (see FIG. 13), which uses the volumeResult 104 to create visual representations of the volume of the fluid and/or its surface.

The deformed implicit surface 112 is deformed based at least in part on parameter values 114 that define one or more mesh regions 116. Each of the mesh region(s) 116 encompasses at least a portion of the implicit surface 110 of the volumeInput 102. The portions (e.g., patches or regions) of the implicit surface 110 identified by the mesh region(s) 116 are selected to include higher resolution surface features (e.g., capillary waves). The mesh region(s) 116 may be stacked or otherwise overlap. Further, the mesh region(s) 116 may flow or otherwise move relative to one another. Thus, the parameter values 114 may define motion paths for the mesh region(s) 116 across two or more frames of a computer animation. The mesh region(s) 116 may embody surface features that include, for example, high frequency waves or ripples (e.g., capillary waves). In a more general case, instead of a mesh, the deformation is represented by a collection of points.

In a computer simulation involving three dimensions and having an output that is imagery (such as a still image or a sequence of video frames), often the virtual object(s) and/or material(s) being simulated are represented relative to a 3D grid in a virtual space with a grid divided into voxels. The mesh region(s) 116 may each have sub-voxel resolution while the volumeInput 102 may be made up of the voxels and may have a resolution determined by the voxels. Thus, the surface features embodied by the mesh region(s) 116 may have a resolution that is greater than the resolution of the volumeInput 102. In other words, the volumeInput 102 may be considered coarse with respect to the mesh region(s) 116 or have a lower resolution than the mesh region(s) 116.

The mesh region(s) 116 is/are each constructed from one or more polygons 118. The polygon(s) 118 is/are two-dimensional ("2D") shapes oriented in 3D space. In other words, each of the mesh region(s) 116 is defined in 3D space by two-dimensional polygons, typically triangles.

Each of the polygon(s) 118 is defined by a plurality of vertices. One or more of a plurality of vertex attributes 120 is/are associated with each vertex of each of the polygon(s) 118. By way of non-limiting examples, the vertex attributes 120 may include one or more of (1) a "position" value (e.g., stored as a vector including three float values ("vec3f")) that marks a position of the vertex in space, (2) a "phase" value (e.g., stored as a float) that describes the input to a function (e.g., a continuous, periodic, scalar-to-scalar function, such as a cosine function) used to determine an amount of normal-direction displacement, and/or (3) an "amplitude" value (e.g., stored as a float) that is a scale on distance to displace.

Figure 2:
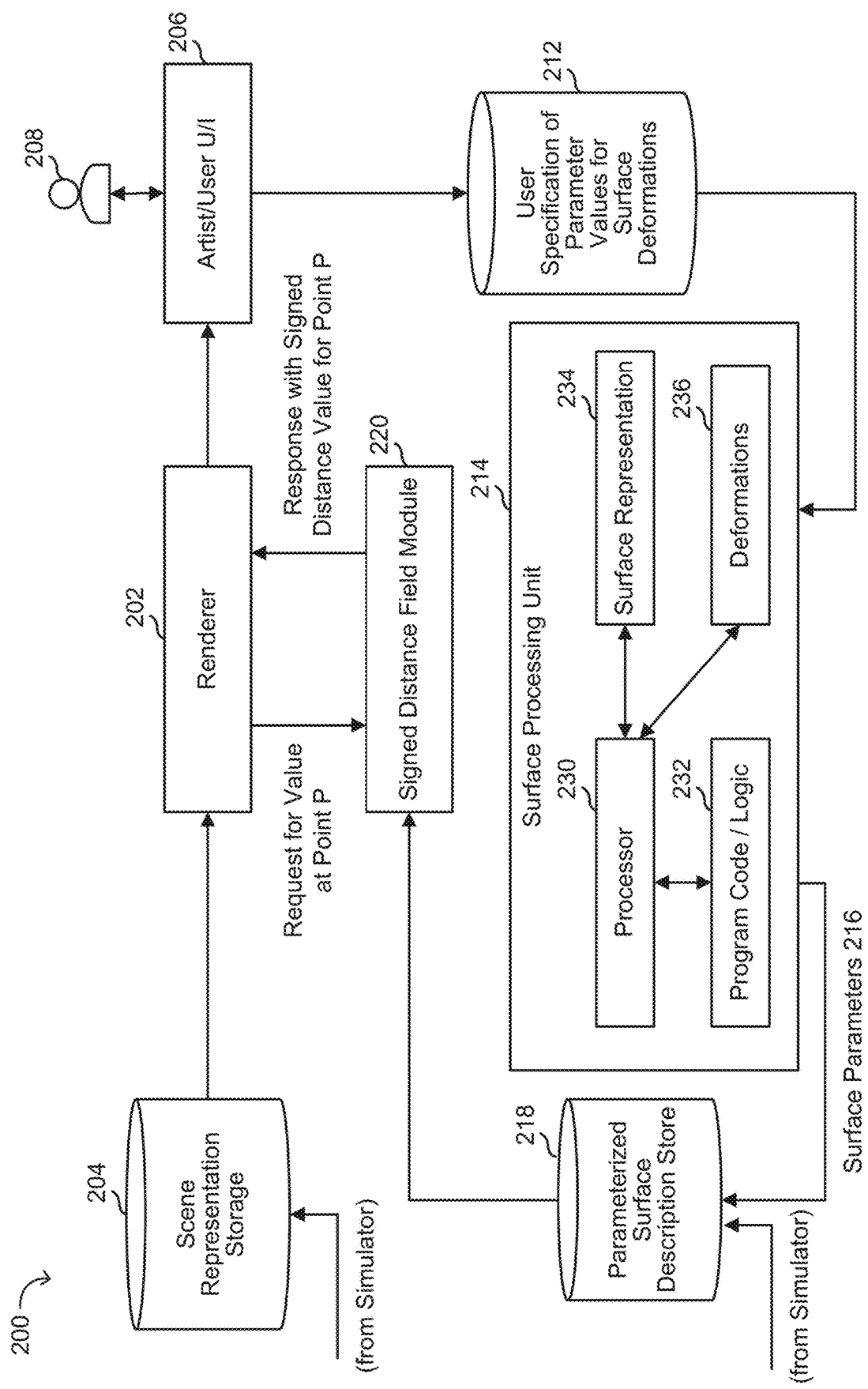
FIG. 2 is a diagram depicting operation of various components to process data in response to user input to derive stored representations of simulated fluid surfaces.

FIG. 2 is a diagram depicting operation of various components of a system 200 to process data in response to user input to derive stored representations of fluid surfaces. In the example there, a renderer 202 generates an image from a scene representation stored in a scene representation storage 204 such that the image can be presented on an artist/user user interface (U/I) 206 to be viewed by a user 208. User 208 might provide inputs at U/I 206 indicating parameter values for deformations of surfaces represented in the scene, which parameters can be stored in a parameter values store 212. A surface processing unit 214 might process those deformation values, possibly using methods described elsewhere herein, to generate surface parameters 216. Surface parameters 216 can be stored in a parameterized surface description store 218, which might also have parameters and data from a simulator. A parameterized surface description might be used for computing signed distance field values.

As illustrated in FIG. 2, a signed distance field module 220 might be called by renderer 202, passing signed distance field module 220 a request for a value of a signed distance field with a value of a point, P, as an argument. Point P might be expressed as a 3D coordinate. In response to such a request, signed distance field module 220 might return a signed distance value calculated based on parameters stored a parameterized surface description in parameterized surface description store 218. On feature of such a system might be that, since surfaces can be defined by a small number of parameters, surfaces and other level sets can be described analytically and at various resolutions rather than being fully defined by polygonal meshes. In some approaches, this would allow for overlays of various resolutions of effects. For example, surfaces can be defined to be merged with other surfaces, possibly with independent levels of detail.

Surface processing unit 214 might comprise a processor 230 that executes instructions stored in program code/logic memory 232 and processes data such as surface representations stored in a surface representation store 234 and deformations stored in a deformations store 236.

Figure 3:
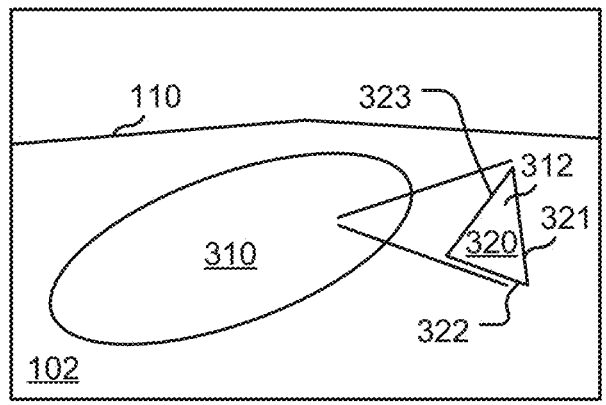
FIG. 3 illustrates an example mesh region with vertices on an implicit surface.

FIG. 3 illustrates an example mesh region with vertices on an implicit surface. By way of a non-limiting example, FIG. 3 illustrates a mesh region 310 with three vertices on an implicit surface 110 and attribute values of 0, pi, and 2*pi with an overlay of the linear interpolation of those attribute values graphed through the periodic function cosine. The mesh region 310 is drawn (e.g., by an artist) on the implicit surface 110 of the volumeInput 102. The mesh region 310 includes a polygon 312 that has a face 320 defined by vertices 321-323. Each vertex has information (e.g., one or more of the vertex attributes 120 illustrated in FIG. 1) associated therewith. For example, each of the vertices 321-323 may have a phase value associated therewith. Optionally, each of the vertices 321-323 may have a magnitude or an amplitude value associated therewith.

Referring back to FIG. 1, the parameter values 114 include one or more runtime user parameters 122. The runtime user parameter(s) 122 may include one or more of (1) a parameter "minimumSampleWidth" that defines how finely detailed (e.g., 0.1 mm) the volumeResult 104 should report itself as being able to deliver, (2) a parameter "maximumDisplacement" for a clamp on maximum allowable displacement of the original implicit surface 110, and/or (3) a parameter "searchBandwidth," which may be used to establish a bandwidth around the implicit surface 110 (positioned at the zero crossing) in which to search for overlapping polygons (e.g., triangles) that will influence the deformed implicit surface 112. The parameter "maximumDisplacement" can provide an "early out" for those sample positions that are sufficiently far enough away from the implicit surface 110 to not require any deformation.

Each of the mesh region(s) 116 might identify a portion of implicit surface 110 and the attributes of the vertices of polygon(s) 118 describe how to deform that portion to yield the volumeResult 104 with deformed implicit surface 112. The vertex attribute values are interpolated and used as inputs to continuous functions, such as a cosine wave, within the polygon(s) 118 to describe continuous features from discrete samples. Both the volumeInput 102 and the volumeResult 104 may be large (e.g., having many meters of surface area) but, unlike the implicit surface 110, the deformed implicit surface 112 may include fine surface detail (e.g., sub-millimeter detail).

The system 100 is shown including a surface simulation system 130, a surface feature solver 132, and at least one client computing device 140 operated by at least one human artist 142. The surface simulation system 130 may be implemented by software executing on one or more computer systems (e.g., each like a computer system 1400 illustrated in FIG. 14). The surface simulation system 130 does not make a new volume having a higher resolution. Instead, the surface simulation system 130 generates a random-access volume sampler or interface 124 that the surface simulation system 130 uses to generate the volumeResult 104. To generate the volumeResult 104, the surface simulation system 130 sends a plurality of sample positions to the interface 124. For each sample position, the interface 124 combines the volumeInput 102 with any of mesh region(s) 116 impacting the sample position and returns a sample distance to the deformed implicit surface 112. The sample distance identifies a position that is displaced from the sample position in a direction that is normal to the implicit surface 110. The interface 124 may use ray tracing to identify any of the polygon(s) 118 that should deform the volumeInput 102 at a particular sample position (e.g., a point). Then, the surface simulation system 130 may use the sample distance to update a signed distance in the signed distance field 108 corresponding to the sample position.

Figure 4:
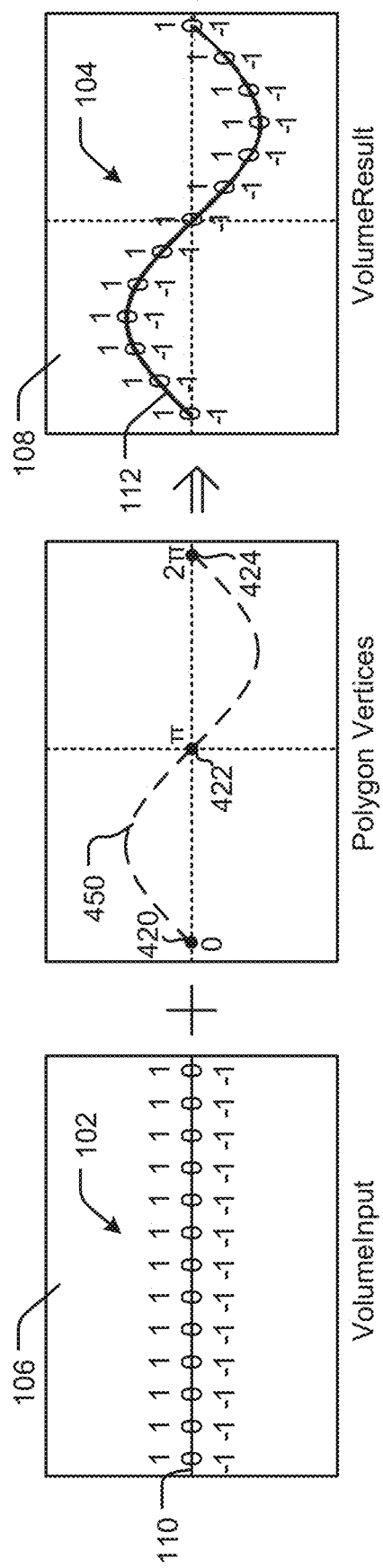
FIG. 4 illustrates a cross-section of a portion of an input implicit surface volume illustrated inside a signed distance field (left), vertices of a polygon forming part of an example mesh region (middle), and a resultant implicit surface volume illustrated inside a signed distance field (right).

FIG. 4 illustrates a cross-section of a portion of an input implicit surface volume illustrated inside a signed distance field (left), vertices of a polygon forming part a mesh region (middle), and the resultant implicit surface volume illustrated inside a signed distance field (right). In signed distance field 108, deformed implicit surface 112 is positioned where distance is 0. Thus, volumeResult 104 may be defined by signed distance field 108.

Deformed implicit surface 112 may be generated from signed distance field 108. In this manner, implicit surface 110 may be characterized as having been displaced or deformed in a direction that is normal to the implicit surface 110. This technique may be characterized as decoupling the bulk fluid (e.g., created by a fluid simulation) from the higher frequency surface features defined by the mesh region(s) 116 (see FIG. 1).

Referring to back to FIG. 1, the vertex attributes 120 specify at least in part how a portion of the implicit surface 110 identified by a particular one of the mesh region(s) 116 is deformed to yield a corresponding portion of the deformed implicit surface 112 of the volumeResult 104. FIG. 4 (middle) illustrates three vertices 420, 422, and 424 of a polygon that forms part of a mesh region (e.g., mesh region 510 in FIG. 5). The vertices 420, 422, and 424 may define attributes from which the displacement of implicit surface 110 may be determined. For example, vertices 420, 422, and 424 are positioned at 0, π, and 2π, which may correspond to the phase value at those positions. A function may be used to interpolate values for other positions between the vertices (as illustrated by the curve 450 formed by the interpolated values) to produce the deformed implicit surface 112. The function may be a periodic function (e.g., a cosine function, a Stokes function, a sine function, and the like). Referring to FIG. 1, the parameter values 114 may identify the function.

Figure 5:
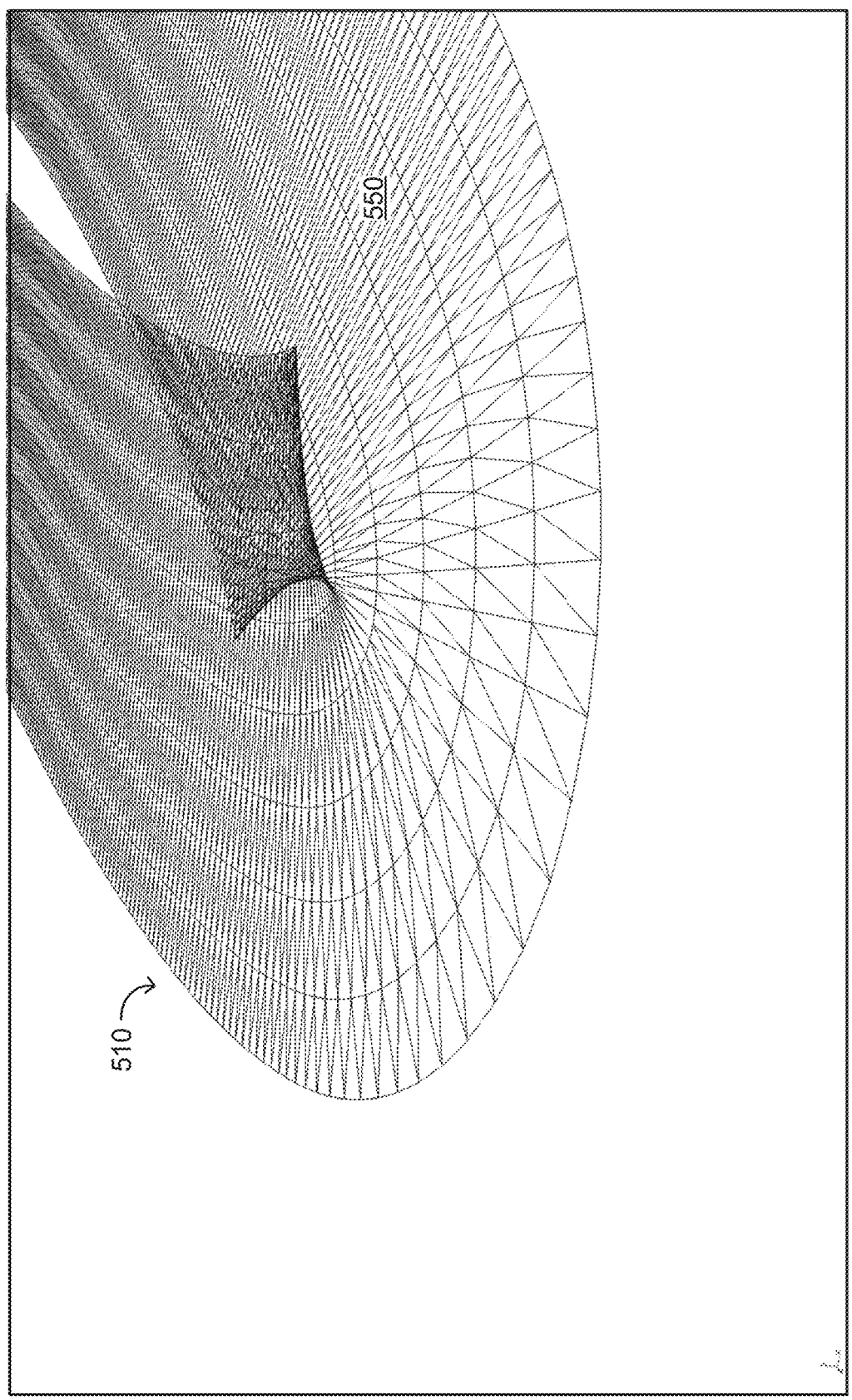
FIG. 5 is a three-dimensional visualization of a mesh region such as the mesh region depicted in FIG. 3.

FIG. 5 is a three-dimensional visualization of a mesh region such as the mesh region depicted in FIG. 3.

FIGS. 4 and 5 illustrate example deformation (or surface features) to be applied to the volumeInput 102 (see FIGS. 1-3, and 6) by the mesh region 510. Referring to FIG. 1, because the artist 142 may provide the parameter values 114, including the mesh region(s) 116, the vertex attributes 120, and/or the function, the deformation of the implicit surface 110 based at least in part on the parameter values 114 may be characterized as being art directable. Region 550 in FIG. 5 may be formed by polygons with vertices that indicate various attributes (e.g., as phase values), such as vertices 420, 422, and 424 illustrated in FIG. 4.

Figure 6:
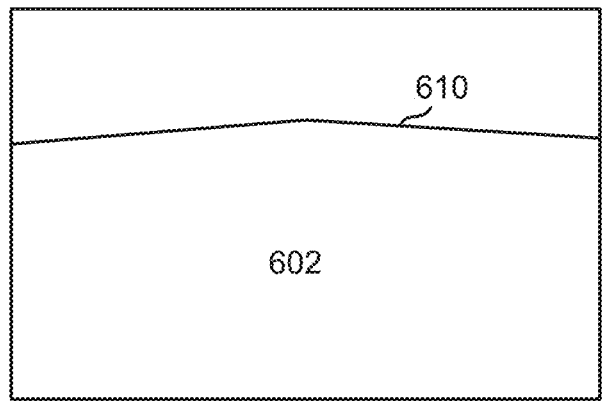
FIG. 6 illustrates an example input implicit surface volume as might be bounded by the implicit surface depicted in FIG. 3.

FIG. 6 illustrates an example input implicit surface volume as might be bounded by the implicit surface depicted in FIG. 3. As illustrated there, an implicit surface volume 602 might include an implicit surface 610. For example, implicit surface volume 602 might have an associated signed distance field that is representable by parameters stored in a parameter store and implicit surface 610, or other level sets, could be easily calculated from the stored parameters as needed.

The artist 142 may use the surface feature solver 132 to define at least in part the mesh region(s) 116 (e.g., the polygon(s) 118). For example, the artist 142 may use the surface feature solver 132 to define the vertex attribute(s) 120 associated with each vertex of each of the polygon(s) 118. The surface feature solver 132 may assign the vertex attributes 120 to the vertices of the polygon(s) 118 (e.g., triangles). By way of another non-limiting example, the artist 142 may use the surface feature solver 132 to select the function. Referring to FIG. 1, the surface feature solver 132 may be implemented by software executing on one or more computer systems (e.g., each like the computer system 1400 illustrated in FIG. 14). While illustrated in FIG. 1 as a separate component, the surface feature solver 132 may be implemented as a component of the surface simulation system 130 and/or the visual content generation system 1300 (see FIG. 13).

As described below, the visual content generation system 1300 (see FIG. 13) is configured to receive the volumeResult 104 as input and output one or more static images and/or one or more animated videos. The static image(s) and/or the animated video(s) include one or more visual representations of the volume of the fluid and/or its surface created based at least in part on the volumeResult 104. The visual content generation system 1300 may transmit the static image(s) and/or the animated video(s) to the client computing device 140 for display to the artist 142. The artist 142 may use the static image(s) and/or the animated video(s) to view the visual representations of the volume of the fluid and/or its surface and make adjustments to the parameter values 114. Then, the surface simulation system 130 may output a new volumeResult 104, which the visual content generation system 1300 may use to output new versions of the static image(s) and/or the animated video(s) that may be viewed by the artist 142 on the client computing device 140. This process may be repeated until the artist 142 is satisfied with the appearance of the volumeResult 104.

As mentioned above, the client computing device 140 is configured to communicate with the surface simulation system 130. The artist 142 may use the client computing device 140 to specify the parameter values 114 to the surface simulation system 130. Optionally, the surface simulation system 130 may be configured to display the volumeResult 104 and/or a simulation based at least in part on the volumeResult 104 to the artist 142 on the client computing device 140 so that the artist 142 may adjust the parameter values 114 as desired before the volumeResult 104 is input into the visual content generation system 1300. As mentioned above, the client computing device 140 is configured to receive the static image(s) and/or the animated video(s) from the visual content generation system 1300 (see FIG. 13) and display the static image(s) and/or the animated video(s) to the artist 142 so that the artist 142 may adjust the parameter values 114. The client computing device 140 may be implemented using the computer system 1400 illustrated in FIG. 14.

Referring to FIG. 1, volumes (like the volumeInput 102) and meshes (like the mesh region(s) 116) are fundamentally different discretizations. For example, volumes are typically Eulerian and meshes are typically Lagrangian. For this reason, volumes and meshes are not often mixed together in a single interface. It is more common to mix volumes and meshes by discretizing one into the other. For example, a new Eulerian volume grid may be created based on identifying closest Lagrangian points for each voxel, which can be restrictive due to scale. By way of another example, a new Lagrangian representation can be created by sampling the Eulerian grid at each position, which may be restrictive because the implicit surface representation is lost and it is needed for rendering and blending fluids.

In contrast, interface 124 may be characterized as exposing a new volume only as an interface for sampling. Thus, interface 124 can limit mixing of the two discretizations to only locations required for sampling. In this manner, interface 124 requires relatively little upfront work and/or memory. Additionally, using the polygon(s) 118 to identify "where to displace" the implicit surface 110 and the vertex attributes 120 to specify "how much to displace" the implicit surface 110 avoids the need for UV mapping, which is a more common approach for displacement maps. This is useful because coherent UV mapping for implicit surfaces is a currently unsolved problem in computer graphics. For this reason, 2D mapping onto 3D implicit surfaces is relatively rare.

Figure 7:
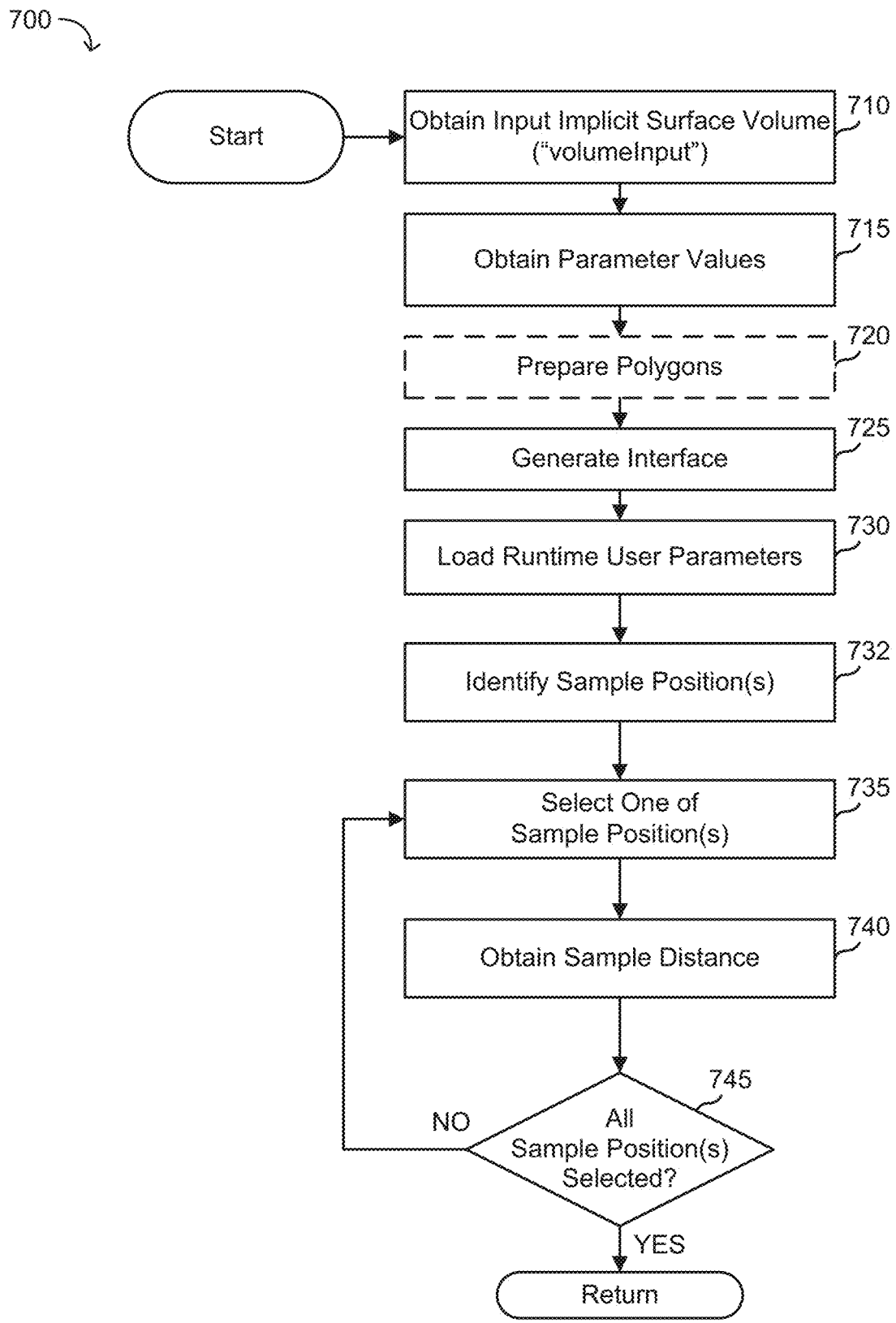
FIG. 7 illustrates a flowchart of the process of generating the resultant implicit surface volume.
Figure 8:
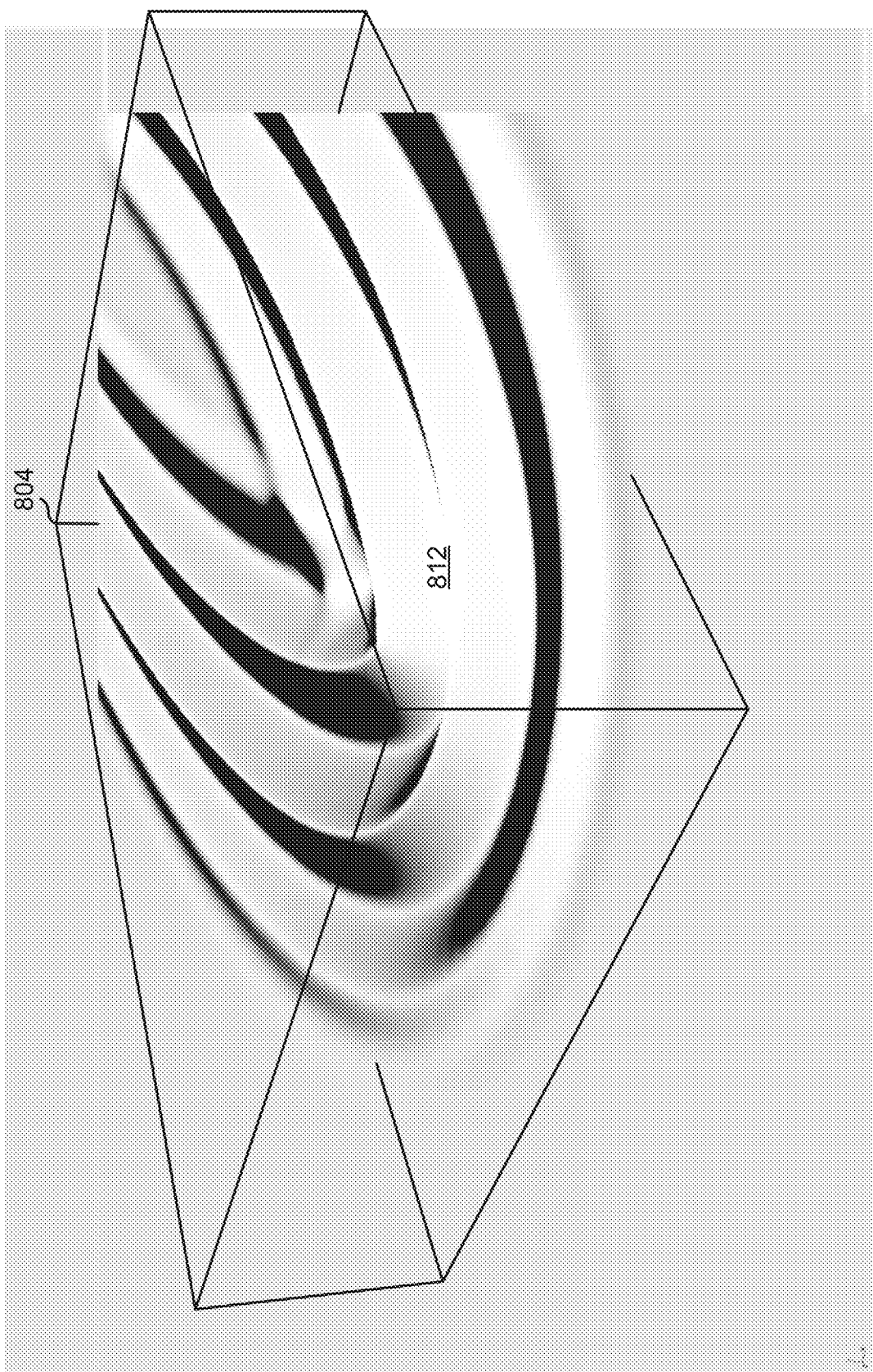
FIG. 8 illustrates an implicit surface within an implicit volume.

FIG. 7 is a flowchart of the process 700 that may be executed by the system 100 (see FIG. 1) and used to deform the implicit surface 110 (see FIGS. 1-3, and 6) of the volumeInput 102 (see FIGS. 1-2 and 6) to generate the deformed implicit surface 112 (see FIGS. 1, 4, and 8) of the volumeResult 104 (see FIGS. 1, 4, and 8). The process 700 may be characterized as including three sub-processes: a data preparation sub-process, a runtime preprocessing sub-process, and a sample sub-process. The data preparation sub-process includes blocks 710-715 of the process 700. The runtime preprocessing sub-process includes blocks 720-730 of the process 700. The sample sub-process includes blocks 732-745 of the process 700.

In first block 710, the surface simulation system 130 (see FIG. 1) obtains the volumeInput 102 (see FIGS. 1-2, and 6), which is defined at least in part by the implicit surface 110 (see FIGS. 3, 4, and 6). Referring to FIG. 4, the implicit surface 110 may be stored in any kind of random access sample-able data structure, including data structures having standard formats, such as an OpenVDB file format created by a fluid simulation. The data structure may store data about the volumeInput 102. For example, the data structure may store the signed distance field 108 and channels "Distance" and "distanceGradient." The channel "Distance" may access the signed distance field 108, which stores a signed distance for each of a plurality of positions. The signed distance is a shortest distance from the position to the implicit surface 110. For example, FIG. 4 illustrates distances −1 to 1. However, the signed distance field 108 may include additional distances beyond distances −1 to 1. The implicit surface 110 is located at distance 0. The surface simulation system 130 is configured to obtain the signed distance for a particular sample position from the channel "distance" (e.g., which may be accurate within at least a narrowband bandwidth). The channel "distanceGradient" stores and/or approximates a gradient of the signed distance. By way of a non-limiting example, the value of the gradient may be approximated from the signed distance using a star-shaped finite difference stencil.

Referring to FIG. 7, in block 715, the surface simulation system 130 (see FIG. 1) obtains the parameter values 114 (see FIG. 1). For example, in block 715, the surface simulation system 130 (see FIG. 1) obtains the mesh region(s) 116 (see FIG. 1) including the values of the vertex attributes 120 (see FIG. 1). For ease of illustration, the process 700 will be described with respect to the mesh region 510 illustrated in FIGS. 3 and 4. However, the process 700 (see FIG. 7) may be performed for multiple different mesh regions.

Referring again to FIG. 3, as mentioned above, the mesh region 310 includes polygons (e.g., the polygon 312) that each include vertices (e.g., the vertices 321-323) and each vertex has information associated therewith. The mesh region 310 may be positioned roughly on the volumeInput 102 (e.g., at or near a zero-crossing in the signed distance field 108 illustrated in FIGS. 1 and 4) in locations intended to be deformed. The mesh region 310 does not need to capture the displacement within its topology. Instead, the mesh region 310 may capture only the location where displacement should occur. As mentioned above, referring to FIG. 1, the artist 142 may use the surface feature solver 132 to define the mesh region 310 (see FIGS. 3 and 4) and its associated vertex attributes 120. By way of non-limiting examples, the vertex attributes 120 may define one or more cosine waves, one or more Stokes waves, combinations thereof, and the like.

The vertex attributes associated with a particular polygon describe how the displacement should be calculated within that particular polygon. The vertex attributes include enough parameters to determine displacement in a normal direction from any point within the face of the particular polygon. As mentioned above, the vertex attributes may include the "position" value, the "phase" value, and the "amplitude" value. The "phase" and "amplitude" values may be inputs to the function (e.g., a cosine function, a Stokes function, a sine function, and the like).

In optional block 720 (see FIG. 7), the surface simulation system 130 may prepare the polygon(s) 118 for fast ray tracing. For example, the surface simulation system 130 may load the polygon 312 (see FIG. 3) into an acceleration structure for use with an optimized ray tracing library (e.g., Embree), and the like.

In block 725 (see FIG. 7), the surface simulation system 130 prepares or generates the interface 124 (see FIG. 1). As mentioned above, referring to FIG. 1, the surface simulation system 130 may use the interface 124 to populate the signed distance field 108 and generate the volumeResult 104. When sampled, the interface 124 combines the volumeInput 102 with one or more of the higher resolution mesh region(s) 116 and returns a sample distance to the deformed implicit surface 112. The surface simulation system 130 may use the sample distance to update a signed distance in the signed distance field 108. For example, FIG. 4 illustrates the signed distance field 108 as including distances −1 to 1. However, the signed distance field 108 may include additional distances beyond distances −1 to 1. The deformed implicit surface 112 is located at distance 0.

In block 730 (see FIG. 7), the surface simulation system 130 loads the runtime user parameter(s) 122 and may use them to configure the interface 124. As mentioned above, the runtime user parameter(s) 122 (see FIG. 1) may include the parameter "minimumSampleWidth," the parameter "maximumDisplacement," and the parameter "searchBandwidth."

At this point, the interface 124 is ready to be used to populate the signed distance field 108, which may be used to create the volumeResult 104 and/or visual representations of the volume of the fluid and/or its surface. For ease of illustration, the surface simulation system 130 will be described as using the interface 124. However, this is not a requirement. Instead, an animation creation system 160, as might be part of visual content generation system 1300 (see FIG. 13) may use the interface 124.

In block 732, the surface simulation system 130 (see FIG. 1) identifies one or more sample points or positions. In other words, the surface simulation system 130 identifies, as the sample positions, the positions of those of the signed distances in the signed distance field 108 (see FIGS. 1 and 4) needed to define the volumeResult 104.

In block 735, the surface simulation system 130 selects one of the sample position(s) identified in block 732.

Then, in block 740, the surface simulation system 130 uses the interface 124 to obtain a sample distance to the deformed implicit surface 112 for the selected sample position. The sample distance is a new position for the selected sample position and is expressed as a distance in the direction that is normal to the implicit surface 110. By way of a non-limiting example, the interface 124 may perform a process (such as a process 1100 shown in FIG. 11) in block 740.

Next, in decision block 745, the surface simulation system 130 determines whether all of the sample position(s) identified in block 732 have been selected in block 735, which means that a sample distance has been obtained for each of the signed distances in the signed distance field 108 (see FIGS. 1 and 4) needed to define the volumeResult 104. The decision in decision block 745 is "YES," when all of the sample position(s) have been selected. Otherwise, the decision in decision block 745 is "NO."

When decision in decision block 745 is "NO," the surface simulation system 130 returns to block 735 and selects another one of the sample position(s).

When decision in decision block 745 is "YES," the surface simulation system 130 may send the signed distance field 108 (see FIGS. 1 and 4) and/or the volumeResult 104 to an animation creation system. The visual content generation system 1300 uses the signed distance field 108 (see FIGS. 1 and 4) and/or the volumeResult 104 to create visual representations of the volume of the fluid and/or its surface such as via ray intersection tests with the signed distance field values. Then, the process 700 terminates.

Referring to FIG. 7, the process 700 may be used to increase functionality by adding high resolution surface detail to fluid simulations, which can be efficiently stored and sampled at render time. The process 700 may be used to implement interactive simulations and/or visualizations. The process 700 removes the burden of capturing capillary wave level resolution from many fluid simulations. Referring to FIG. 1, the process 700 (see FIG. 7) allows artists to split simulation work into lower resolution bulk fluid (for the volumeInput 102) and higher resolution surface displacement (for the mesh region(s) 116) because the process 700 allows the artist to readily combine this work.

FIG. 8 illustrates an implicit surface within an implicit volume. As shown there, an example input implicit surface volume 804 and an implicit surface 812. For example, implicit surface volume 804 might have an associated signed distance field that is representable by parameters stored in a parameter store and implicit surface 812, or other level sets, could be easily calculated from the stored parameters as needed.

Figure 9:
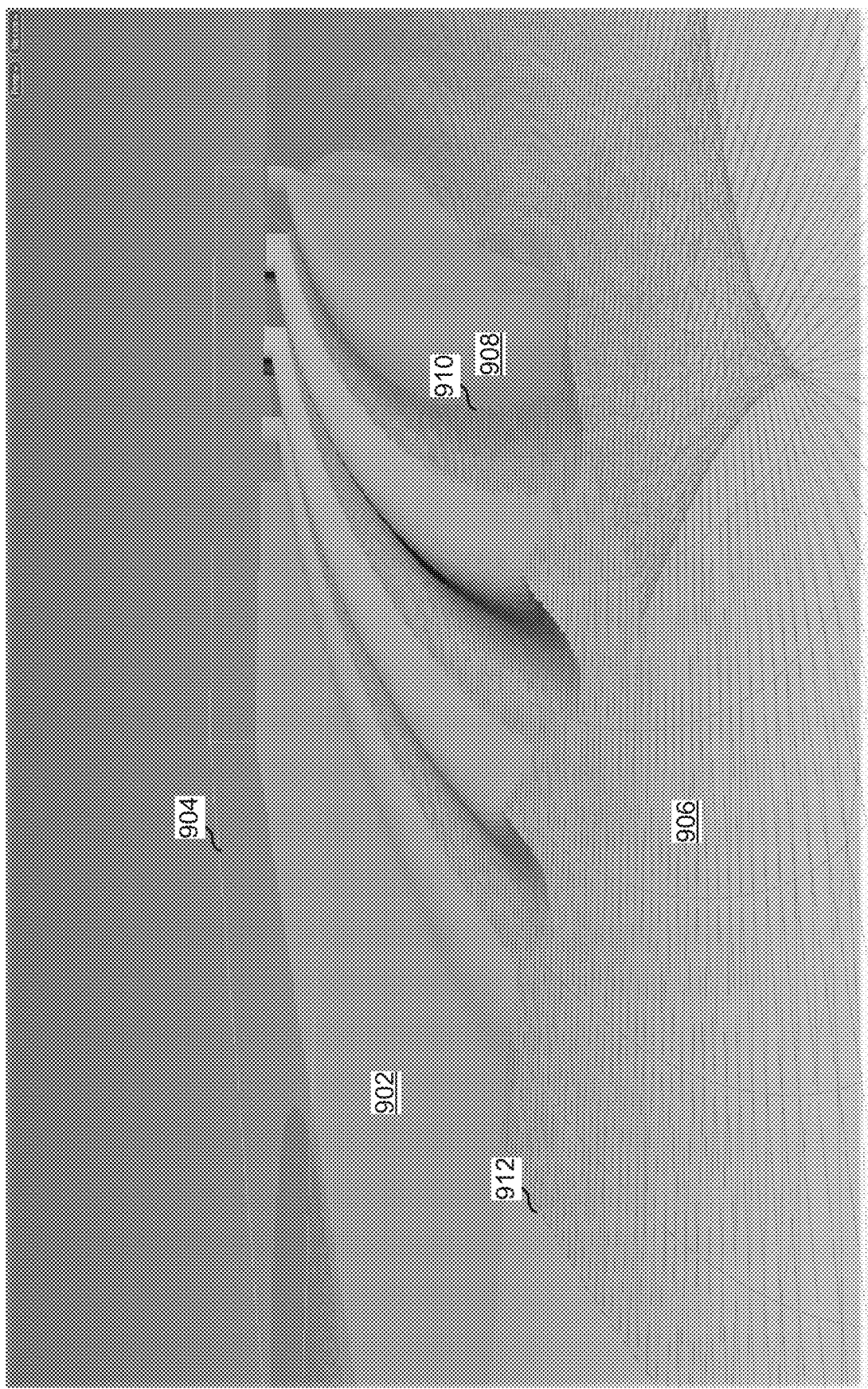
FIG. 9 illustrates a modified implicit surface defined by displacements wherein the displacements are determined by a local subset of a collection of points, each having an associated set of attributes, where the collection of points might form a mesh.

FIG. 9 illustrates a modified implicit surface defined by displacements wherein the displacements are determined by a local subset of a collection of points, each having an associated set of attributes, where the collection of points might form a mesh. As illustrated there, an implicit surface 902 might be defined within an implicit volume 904 using relatively low-resolution values, such as a small voxel array. A collection of points might be treated as vertices of a mesh 906, but other collections of points might be used. At each point (assuming all points are used), an associated set of attribute values might be stored. Examples of attributes for a point might be a phase, amplitude, frequency, offset, etc. A high resolution implicit surface 908 might be computed by displacing implicit surface 902 represented as a first digital representation by a second digital representation that corresponds to mesh 906. As an example, a point 910 of high resolution implicit surface 908 might be located based on a point on implicit surface 902 that is displaced by a displacement value, wherein the displacement value is computed as some function of attribute values of mesh vertices in a local subset of the mesh vertices around point 910. In the example illustrated, the attribute values of the vertices of mesh 906 are such that they collectively represent waves.

One attribute might be a mask value. For example, at a point 912 of the collection of points, a mask attribute might be close to 1.0 whereas the mask attribute of point 910 might be close to 0.0. In this example, an effect of the mask attribute might be to diminish an effect of other attributes of the point, such that in the computation of the displacement value, a high mask value reduces the resulting displacement value. The attributes might be generated programmatically. For example, an artist might specify waves to follow a curve and a decay parameter and program code might generate the attributes that are stored for each point in the collection of points, so that when an implicit surface displacement is computed, it conveys waves that smoothly reduce in amplitude, as depicted in FIG. 9.

FIG. 10 illustrates example pseudocode implementing a "sampleVolumeResult" function calculation.

Figure 11:
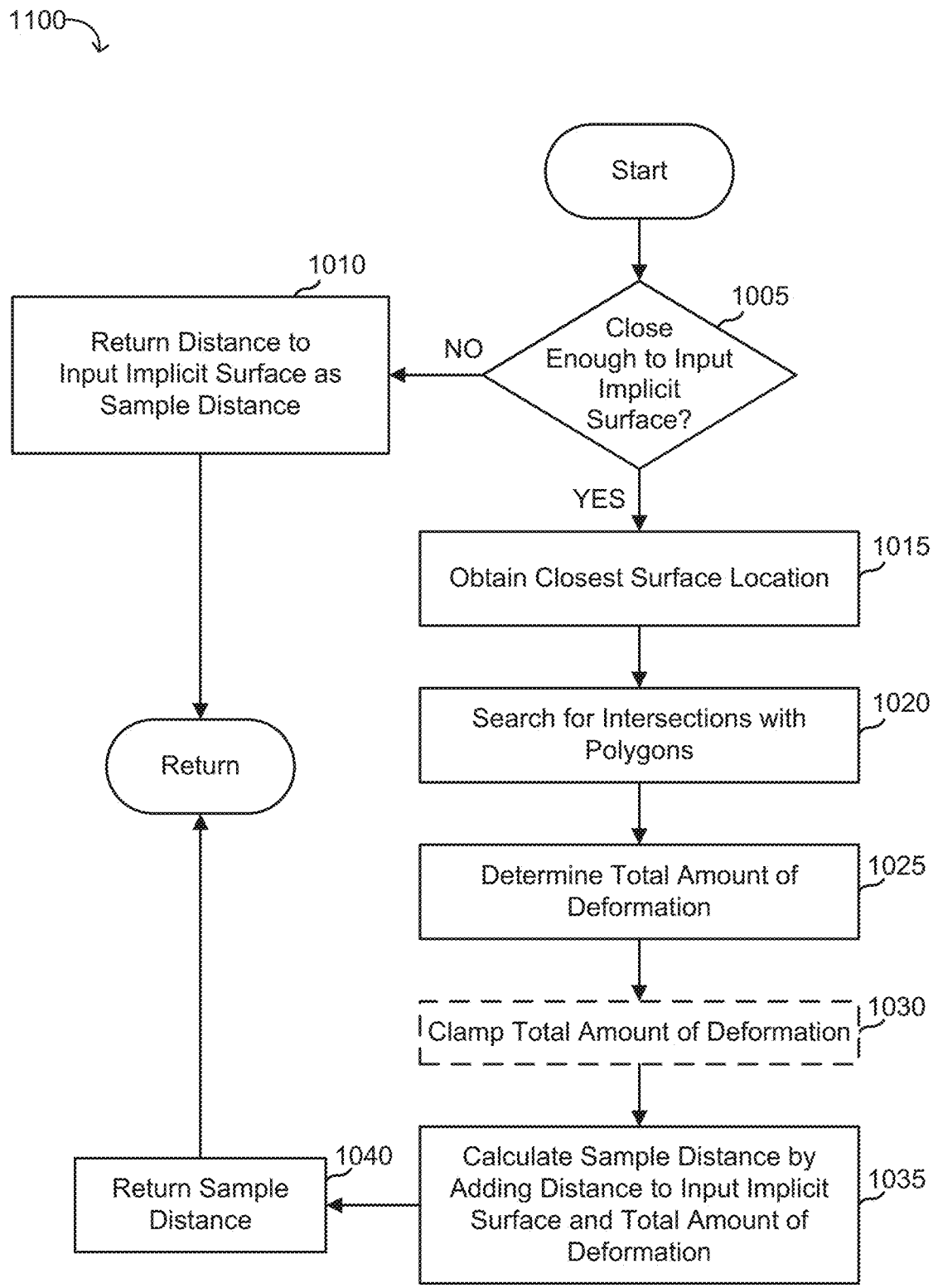
FIG. 11 illustrates a flowchart of a process of obtaining, for a selected sample position, a sample distance to a deformed implicit surface of the resultant implicit surface volume.

FIG. 11 is a flowchart of the process 1100 that the interface 124 may execute in block 740 (see FIG. 7) and use to obtain the sample distance for the selected sample position. By way of a non-limiting example, the interface 124 may include an exposed function "sampleVolumeResult" that may be called by the surface simulation system 130. Thus, in block 740 (see FIG. 7), the surface simulation system 130 may call the function "sampleVolumeResult." The function "sampleVolumeResult" receives the selected sample position (represented by a variable "P") as a vector that includes three float values and returns a float value that is the sample distance for the selected sample position. The sample distance is expressed as a distance in the direction that is normal to the implicit surface 110. The function "sampleVolumeResult" has access to the volumeInput 102 and the polygon(s) 118 (e.g., polygon 512) optionally prepped for ray tracing in optional block 720 (see FIG. 7).

FIG. 11, in a decision block 1105, the interface 124 (see FIG. 1) decides whether the selected sample position (stored in the variable "P") is close enough to the implicit surface 110 to be deformed. By way of a non-limiting example, referring to FIG. 1, the interface 124 may obtain the signed distance for the selected sample position (stored in the variable "P") from the channel "distance" and store the signed distance in a variable "distanceToSurface."

Then, the interface 124 may compare the absolute value of the variable "distanceToSurface" to the value of the parameter "maximumDisplacement." In such embodiments, the decision in decision block 1105 is "NO," when the absolute value of the variable "distanceToSurface" is greater than the value of the parameter "maximumDisplacement." Otherwise, the decision in decision block 1105 is "YES."

When the decision in decision block 1105 is "NO," the sample position is not close enough to the implicit surface 110 to deform it. When this is the case, in block 1110, the interface 124 returns (to the surface simulation system 130) the value of the variable "distanceToSurface" as the sample distance to the deformed implicit surface 112 for the selected sample position (stored in the variable "P"). Then, the process 1100 terminates.

When the decision in decision block 1105 is "YES," the sample position is close enough to the implicit surface 110 to deform it. When this is the case, in block 1115, the interface 124 obtains the closest surface position (e.g., stored in a variable "surfacePosition"). The interface 124 may obtain the closest surface position by first obtaining the gradient at the selected sample position (stored in the variable "P"). By way of a non-limiting example, the interface 124 may obtain the gradient for the selected sample position from the channel "distanceGradient" and store the gradient in a variable "gradient." The interface 124 may normalize the value of the variable "gradient." Then, the interface 124 may calculate the value of the variable "surfacePosition" by multiplying the value of the variable "gradient" by the value of the variable "distanceToSurface" and subtracting this product from the selected sample position (stored in the variable "P").

Next, in block 1120, the interface 124 searches for intersecting polygons and the locations of those intersections. Referring to FIG. 1, the interface 124 may search for intersecting polygons by creating a line segment. The line segment extends along the gradient (stored in the variable "gradient") through the closest surface location (e.g., stored in the variable "surfacePosition") between a first end point (stored in a variable "rayStart") and a second end point (stored in a variable "rayEnd"). The first end point (stored in the variable "rayStart") is located above the implicit surface 112 and the second end point (stored in the variable "rayEnd") is located below the implicit surface 112. The value of the variable "rayStart" may be calculated by multiplying the value of the variable "gradient" by the parameter "searchBandwidth" divided by two and subtracting the result from the value of variable "surfacePosition." The value of the variable "rayEnd" may be calculated by multiplying the value of the variable "gradient" by the parameter "searchBandwidth" divided by two and adding the result to the value of variable "surfacePosition." Then, the interface 124 uses ray tracing along the line segment from the first end point (stored in the variable "rayStart") to the second end point (stored in the variable "rayEnd") to identify all of the polygons (e.g., triangles) intersected by the line segment and locations of those intersections. Next, for each of the intersections, the interface 124 determines a value by interpolating the vertex attributes (e.g., the phase, the amplitude, and the like) based on the intersection location.

In other words, in block 1120, for each sample position that is close enough to the implicit surface 110, the interface 124 casts a ray including the line segment extending from the first end point (stored in the variable "rayStart") to the second end point (stored in the variable "rayEnd") that extends through the implicit surface 110 at the closest position. The ray extends predetermined distances above and below the implicit surface 110 determined by the values of the variables "rayStart" and "rayEnd," respectively. The ray is cast in the direction of the gradient of the implicit surface 110. Any of the polygon(s) 118 intersected by the ray contribute to deforming the deformed implicit surface 112. Thus, identifying those of the polygon(s) 118 that should deform the volumeInput 102 at a particular sample position may be characterized as being a ray tracing problem within a narrow band of a level set.

In block 1125, for each intersection, the interface 124 determines an amount of deformation in a normal direction and accumulates the amounts of deformation to obtain a total amount of deformation (e.g., stored in a variable "totalDisplacement"). For example, the interface 124 may allocate the variable "totalDisplacement" (e.g., type float) and set its initial value equal to zero. For each intersection, the interface 124 may use barycentric coordinates to interpolate the vertex attributes of the intersected polygon at the intersection. For example, a function "verticalDisplacement" may interpolate the vertex attributes and return the displacement, which is stored by the interface 124 in a variable "displacement" (e.g., type float). The interpolated vertex attributes may include the "phase" value and the "amplitude" value. Then, the value of the variable "displacement" is added to the value of the variable "totalDisplacement." By way of a non-limiting example, the function "verticalDisplacement" may calculate the value of the variable "displacement" using a function "cosine" with the interpolated vertex attributes (e.g., the "phase" value and the "amplitude" value) being inputs to the function "cosine."

In other words, in block 1125, for each polygon that is intersected by the ray, the values (e.g., phase and amplitude) of the vertex attributes 120 of the polygon are interpolated (e.g., based on the position of the intersection) to obtain the interpolated vertex attributes. Then, for each polygon that is intersected by the ray, the interpolated vertex attributes are used to calculate the value of the variable "displacement" and these values are combined (in the variable "totalDisplacement") for all of the intersected polygons. The total amount of deformation identified by the value of the variable "totalDisplacement" is in a direction that is normal to the implicit surface 110.

Next, in optional block 1130, the interface 124 may constrain or clamp the total amount of deformation (e.g., stored in the variable "totalDisplacement") to help avoid runaway or extreme displacement. For example, a function "easedClamp" may receive as inputs the variable "totalDisplacement" and the parameter "maximumDisplacement" and may return the constrained value of the variable "totalDisplacement."

Then, in block 1135, the interface 124 calculates the sample distance as a sum of the values of the variable "distanceToSurface" and the variable "totalDisplacement." Thus, the interface 124 determines the sample distance based at least in part on the value of the variable "distanceToSurface." Finally, in block 1140, the interface 124 returns (to surface simulation system 130) the sample distance and the process 1100 terminates. As mentioned above, the surface simulation system 130 may use the sample distance to update the signed distance field 108.

FIG. 12 illustrates example pseudocode implementing a "verticalDisplacement" function calculation.

Figure 13:
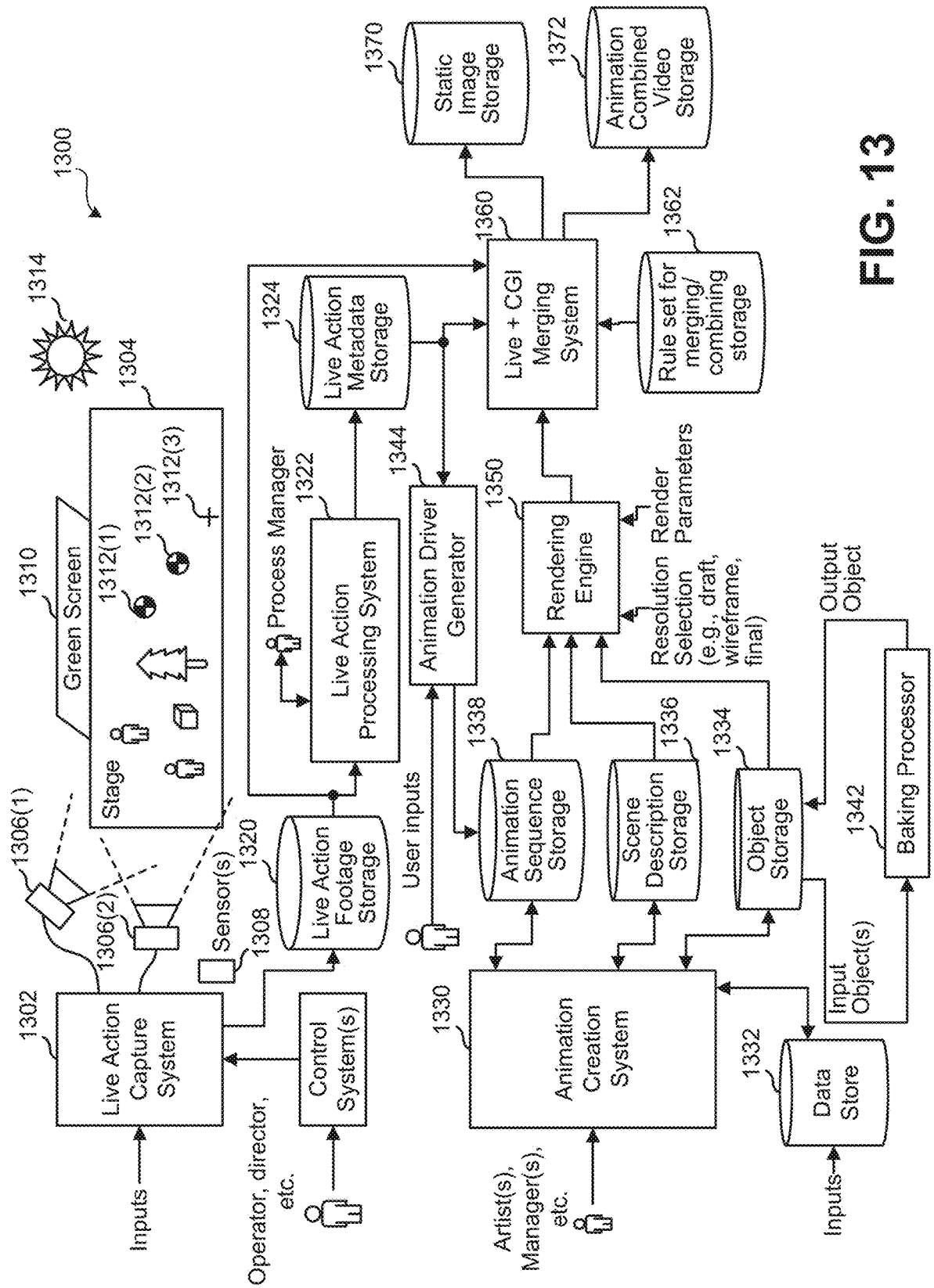
FIG. 13 illustrates an example visual content generation system as might be used to generate imagery in the form of still images and/or video sequences of images, according to various embodiments.

FIG. 13 illustrates the example visual content generation system 1300 as might be used to generate imagery in the form of still images and/or video sequences of images. Visual content generation system 1300 might generate imagery of live action scenes, computer generated scenes, or a combination thereof. In a practical system, users are provided with tools that allow them to specify, at high levels and low levels where necessary, what is to go into that imagery. For example, a user might be an animation artist (like artist 142 illustrated in FIG. 1) and might use visual content generation system 1300 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1300 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50

FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist (e.g., artist 142 illustrated in FIG. 1) might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 13, a live action capture system 1302 captures a live scene that plays out on a stage 1304. Live action capture system 1302 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1306(1) and 1306(2) capture the scene, while in some systems, there might be other sensor(s) 1308 that capture information from the live scene (e.g., infrared cameras, infrared sensors, motion capture ("mo-cap") detectors, etc.). On stage 1304, there might be human actors, animal actors, inanimate objects, background objects, and possibly an object such as a green screen 1310 that is designed to be captured in a live scene recording in such a way that it is easily overlaid with computer-generated imagery. Stage 1304 might also contain objects that serve as fiducials, such as fiducials 1312(1)-(3), that might be used post-capture to determine where an object was during capture. A live action scene might be illuminated by one or more lights, such as an overhead light 1314.

During or following the capture of a live action scene, live action capture system 1302 might output live action footage to a live action footage storage 1320. A live action processing system 1322 might process live action footage to generate data about that live action footage and store that data into a live action metadata storage 1324. Live action processing system 1322 might include computer processing capabilities, image processing capabilities, one or more processors, program code storage for storing program instructions executable by the one or more processors, as well as user input devices and user output devices, not all of which are shown. Live action processing system 1322 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 1314, as that might be useful in post-processing to match computer-generated lighting on objects that are computer-generated and overlaid on the live action footage. Live action processing system 1322 might operate autonomously, perhaps based on predetermined program instructions, to generate and output the live action metadata upon receiving and inputting the live action footage. The live action footage can be camera-captured data as well as data from other sensors.

An animation creation system 1330 is another part of visual content generation system 1300. Animation creation system 1330 might include computer processing capabilities, image processing capabilities, one or more processors, program code storage for storing program instructions executable by the one or more processors, as well as user input devices and user output devices, not all of which are shown. Animation creation system 1330 might be used by animation artists, managers, and others to specify details, perhaps programmatically and/or interactively, of imagery to be generated. From user input and data from a database or other data source, indicated as a data store 1332, animation creation system 1330 might generate and output data representing objects (e.g., a horse, a human, a ball, a teapot, a cloud, a light source, a texture, etc.) to an object storage 1334, generate and output data representing a scene into a scene description storage 1336, and/or generate and output data representing animation sequences to an animation sequence storage 1338.

Scene data might indicate locations of objects and other visual elements, values of their parameters, lighting, camera location, camera view plane, and other details that a rendering engine 1350 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1330 might be interactive, allowing a user to read in animation sequences, scene descriptions, object details, etc. and edit those, possibly returning them to storage to update or replace existing data. As an example, an operator might read in objects from object storage into a baking processor 1342 that would transform those objects into simpler forms and return those to object storage 1334 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 1332 might be used to drive object presentation. For example, if an artist is creating an animation of a spaceship passing over the surface of the Earth, instead of manually drawing or specifying a coastline, the artist might specify that animation creation system 1330 is to read data from data store 1332 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1344 might read in live action metadata, such as data representing movements and positions of body parts of a live actor during a live action scene. Animation driver generator 1344 might generate corresponding animation parameters to be stored in animation sequence storage 1338 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1322. Animation driver generator 1344 might convert that movement data into specifications of how joints of an articulated CGI character are to move over time.

A rendering engine 1350 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 1350 might include computer processing capabilities, image processing capabilities, one or more processors, program code storage for storing program instructions executable by the one or more processors, as well as user input devices and user output devices, not all of which are shown.

Visual content generation system 1300 can also include a merging system 1360 that merges live footage with animated content. The live footage might be obtained and input by reading from live action footage storage 1320 to obtain live action footage, by reading from live action metadata storage 1324 to obtain details such as presumed segmentation in captured images segmenting objects in a live action scene from their background (perhaps aided by the fact that green screen 1310 was part of the live action scene), and by obtaining CGI imagery from rendering engine 1350.

A merging system 1360 might also read data from rulesets for merging/combining storage 1362. A very simple example of a rule in a ruleset might be "obtain a full image including a two-dimensional pixel array from live footage, obtain a full image including a two-dimensional pixel array from rendering engine 1350, and output an image where each pixel is a corresponding pixel from rendering engine 1350 when the corresponding pixel in the live footage is a specific color of green, otherwise output a pixel value from the corresponding pixel in the live footage."

Merging system 1360 might include computer processing capabilities, image processing capabilities, one or more processors, program code storage for storing program instructions executable by the one or more processors, as well as user input devices and user output devices, not all of which are shown. Merging system 1360 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1360, such as modifying boundaries of segmented objects, inserting blurs to smooth out imperfections, or adding other effects. Based on its inputs, merging system 1360 can output an image to be stored in a static image storage 1370 and/or a sequence of images in the form of video to be stored in an animated/combined video storage 1372.

Thus, as described, visual content generation system 1300 can be used to generate video that combines live action with computer-generated animation using various components and tools, some of which are described in more detail herein. While visual content generation system 1300 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 14:
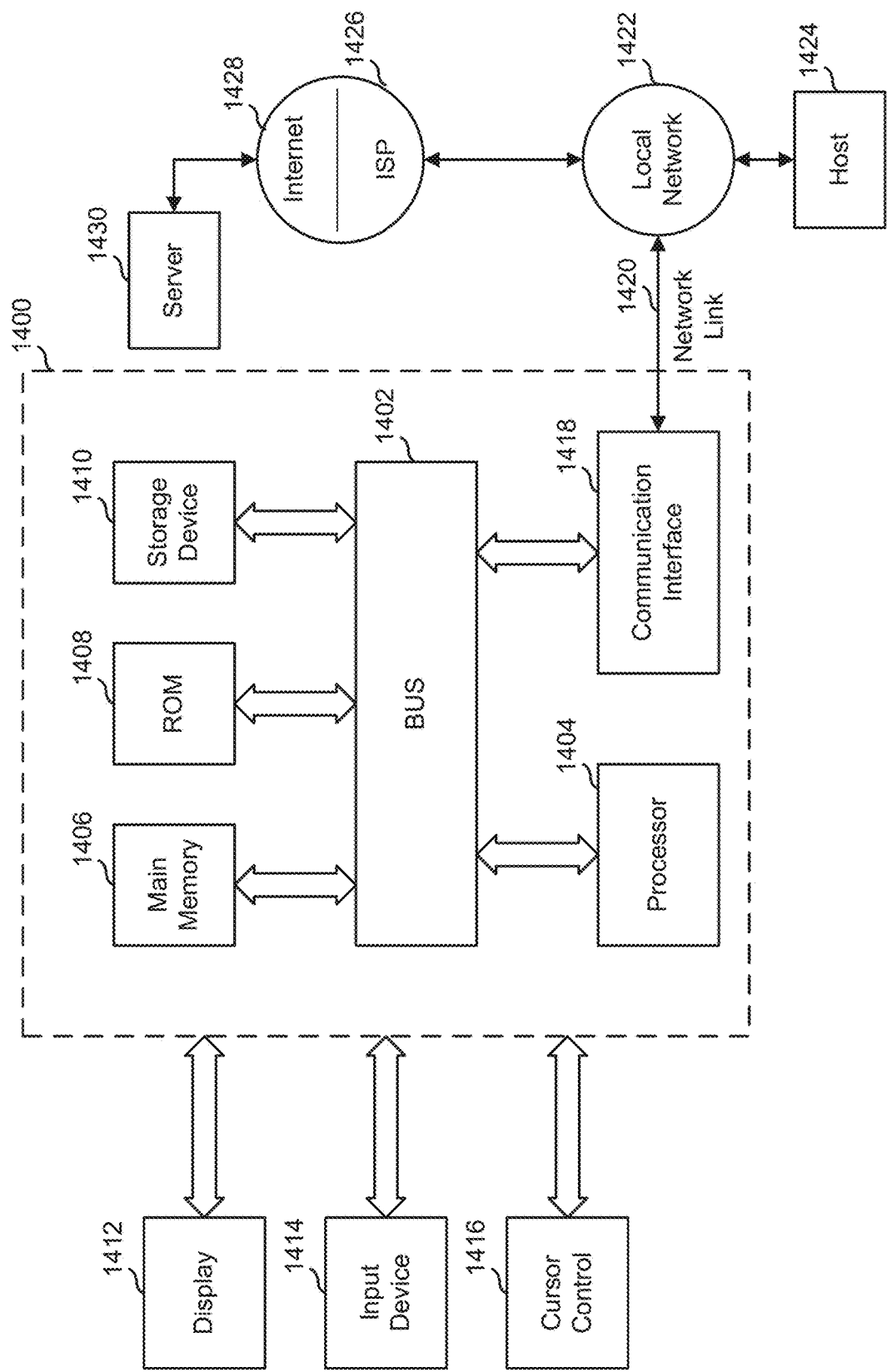
FIG. 14 is a block diagram illustrating an example computer system upon which computer systems of the systems illustrated in FIGS. 1 and 13 may be implemented.

For example, FIG. 14 is a block diagram that illustrates a computer system 1400 upon which the computer systems of the systems described herein and/or visual content generation system 1300 (see FIG. 13) may be implemented. Computer system 1400 includes a bus 1402 or other communication mechanism for communicating information, and a processor 1404 coupled with bus 1402 for processing information. Processor 1404 may be, for example, a general-purpose microprocessor.

Computer system 1400 also includes a main memory 1406, such as a random-access memory (RAM) or other dynamic storage device, coupled to bus 1402 for storing information and instructions to be executed by processor 1404. Main memory 1406 may also be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a computer monitor, for displaying information to a computer user. An input device 1414, including alphanumeric and other keys, is coupled to bus 1402 for communicating information and command selections to processor 1404. Another type of user input device is a cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a network connection. A modem or network interface local to computer system 1400 can receive the data. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be a network card, a modem, a cable modem, or a satellite modem to provide a data communication connection to a corresponding type of telephone line or communications line. Wireless links may also be implemented. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world-wide packet data communication network now commonly referred to as the "Internet" 1428. Local network 1422 and Internet 1428 both use electrical, electromagnetic, or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420, and communication interface 1418. In the Internet example, a server 1430 might transmit a requested code for an application program through the Internet 1428, ISP 1426, local network 1422, and communication interface 1418. The received code may be executed by processor 1404 as it is received, and/or stored in storage device 1410, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for sampling surface features, wherein the surface features represent features of a virtual fluid, the computer-implemented method comprising:
    under the control of one or more computer systems configured with executable instructions:
        obtaining a first digital representation of the virtual fluid defined at least in part by an implicit surface;
        obtaining a second digital representation of a collection of points defined relative to at least a portion of the implicit surface whereat the surface features are to be determined, wherein:
            a point of the collection of points has associated therewith a plurality of attribute values specifying a property of the surface features; and
            the collection of points is a collection of vertices that represents a mesh region comprising a plurality of vertices defining a plurality of polygons;
        determining, for an input point, a corresponding implicit surface point;
        determining, for the corresponding implicit surface point, a subset of the collection of points within a search region relative to the corresponding implicit surface point;
        obtaining a set of interpolated attribute values by interpolating attributes of the plurality of attribute values associated with points of the subset of the collection of points;
        computing a surface displacement value from the set of interpolated attribute values; and
        generating a dataset corresponding to the surface features on at least computed surface displacement values.

2. The computer-implemented method of claim 1, wherein the property of the surface features is a displacement from the implicit surface.

3. The computer-implemented method of claim 1, wherein determining the corresponding implicit surface point for the input point comprises:
    determining a first signed distance field value for the input point;
    determining a first field gradient value for the input point; and
    determining the corresponding implicit surface point from a position of the input point, the first signed distance field value, and the first field gradient value.

4. The computer-implemented method of claim 1, wherein the first digital representation represents the virtual fluid in an Eulerian grid representation and the second digital representation represents the mesh region as a plurality of Lagrangian points.

5. The computer-implemented method of claim 1, wherein one or more visual representations of the surface features depict capillary waves on a surface of the virtual fluid.

6. The computer-implemented method of claim 1, wherein the collection of points is defined at a higher resolution than the implicit surface.

7. The computer-implemented method of claim 1, wherein the plurality of attribute values comprises a phase value and/or an amplitude value.

8. A computer system for generating one or more visual representations of surface features of a virtual fluid, the computer system comprising:
   at least one processor; and
   a computer-readable medium storing instructions, which when executed by the at least one processor, causes the computer system to carry out the method of claim 1.

9. A non-transitory computer-readable storage medium storing instructions, which when executed by at least one processor of a computer system, causes the computer system to carry out the method of claim 1.

10. A computer-implemented method for sampling surface features, wherein the surface features represent features of a virtual fluid, the computer-implemented method comprising:
   under the control of one or more computer systems configured with executable instructions:
      obtaining a first digital representation of the virtual fluid defined at least in part by an implicit surface;
      obtaining a second digital representation of a collection of points defined relative to at least a portion of the implicit surface whereat the surface features are to be determined, wherein:
         a point of the collection of points has associated therewith a plurality of attribute values specifying a property of the surface features; and
         the collection of points represents a mesh;
      determining, for an input point, a corresponding implicit surface point;
      determining, for the corresponding implicit surface point, a subset of the collection of points within a search region relative to the corresponding implicit surface point, wherein the determining the subset of the collection of points within the search region relative to the corresponding implicit surface point comprises:
         (a) using ray casting to cast a ray from the input point through the corresponding implicit surface point;
         (b) identifying one or more intersected polygons of a plurality of polygons of the mesh that are intersected by the ray;
         (c) determining a plurality of vertices corresponding to vertices of one or more polygon of the one or more intersected polygons; and
         (d) processing the plurality of vertices as the subset of the collection of points;
      obtaining a set of interpolated attribute values by interpolating attributes of the plurality of attribute values associated with points of the subset of the collection of points;
      computing a surface displacement value from the set of interpolated attribute values; and
      generating a dataset corresponding to the surface features on at least computed surface displacement values.

11. The computer-implemented method of claim 10, wherein the ray extends from the input point passing through the corresponding implicit surface point to a ray endpoint that is a predetermined distance from the corresponding implicit surface point along the ray.

12. The computer-implemented method of claim 10, wherein the ray extends to a sample position for which a signed distance between the sample position and the implicit surface meets a maximum-displacement threshold.

13. The computer-implemented method of claim 12, further comprising:
   obtaining a second plurality of distances for a second plurality of sample positions,
   wherein the second plurality of sample positions includes a particular sample position for which the signed distance between the particular sample position and the implicit surface does not meet the maximum-displacement threshold, each distance of the second plurality of distances being equal to the signed distance between the particular sample position and the implicit surface, and
   wherein the generating one or more visual representations is based on at least some of the second plurality of distances.

14. The computer-implemented method of claim 10, wherein the property of the surface features is a displacement from the implicit surface.

15. The computer-implemented method of claim 10, wherein determining the corresponding implicit surface point for the input point comprises:
   determining a first signed distance field value for the input point;
   determining a first field gradient value for the input point; and
   determining the corresponding implicit surface point from a position of the input point, the first signed distance field value, and the first field gradient value.

16. The computer-implemented method of claim 10, wherein the first digital representation represents the virtual fluid in an Eulerian grid representation and the second digital representation represents the mesh region as a plurality of Lagrangian points.

17. The computer-implemented method of claim 10, wherein one or more visual representations of the surface features depict capillary waves on a surface of the virtual fluid.

18. The computer-implemented method of claim 10, wherein the collection of points is defined at a higher resolution than the implicit surface.

19. The computer-implemented method of claim 10, wherein the plurality of attribute values comprises a phase value and/or an amplitude value.

20. A computer system for generating one or more visual representations of surface features of a virtual fluid, the computer system comprising:
   at least one processor; and
   a computer-readable medium storing instructions, which when executed by the at least one processor, causes the computer system to carry out the method of claim 10.

* * * * *